United States Patent
Hofer et al.

(10) Patent No.: US 7,400,957 B2
(45) Date of Patent: Jul. 15, 2008

(54) PROCESS AND STEERING SYSTEM FOR THE AUTOMATIC STEERING OF AN AGRICULTURAL VEHICLE

(75) Inventors: Jürgen Hofer, Grossbundenbach (DE); Manfred Bohner, Karlsruhe (DE); Thorsten Freichel, Riegelsberg (DE)

(73) Assignee: Deere & Company, Moline, IL (US)

( * ) Notice: Subject to any disclaimer, the term of this patent is extended or adjusted under 35 U.S.C. 154(b) by 667 days.

(21) Appl. No.: 10/973,863

(22) Filed: Oct. 26, 2004

(65) Prior Publication Data
US 2005/0102079 A1 May 12, 2005

(30) Foreign Application Priority Data
Nov. 6, 2003 (DE) ................. 103 51 861

(51) Int. Cl.
*A01B 69/00* (2006.01)
(52) U.S. Cl. ............... 701/41; 701/50; 172/2; 172/4.5
(58) Field of Classification Search ............ 701/41, 701/49, 50; 172/2, 4.5; 37/348
See application file for complete search history.

(56) References Cited
U.S. PATENT DOCUMENTS

| | | | | |
|---|---|---|---|---|
| 3,952,828 | A | * | 4/1976 | Stampfer et al. ......... 56/10.2 F |
| 5,253,302 | A | * | 10/1993 | Massen ..................... 382/110 |
| 6,278,918 | B1 | | 8/2001 | Dickson et al. |
| 6,285,930 | B1 | | 9/2001 | Dickson et al. |
| 6,336,051 | B1 | * | 1/2002 | Pangels et al. ............... 700/50 |
| 6,385,515 | B1 | | 5/2002 | Dickson et al. |
| 6,490,539 | B1 | | 12/2002 | Dickson et al. |
| 2002/0106108 | A1 | | 8/2002 | Benson et al. |

FOREIGN PATENT DOCUMENTS

| | | |
|---|---|---|
| DE | 35 07 570 | 3/1985 |
| DE | 100 40 614 | 8/2000 |
| EP | 0 801 885 | 4/1997 |
| EP | 0 801 885 | 10/1997 |
| EP | 0 887 660 | 3/1998 |
| EP | 1 271 139 | 6/2002 |
| JP | 1-319878 | 12/1989 |
| JP | 3-012713 | 1/1991 |
| WO | WO 96/17279 | 6/1996 |
| WO | WO 98/46065 | 4/1998 |

* cited by examiner

*Primary Examiner*—Gertrude Arthur Jeanglaud

(57) ABSTRACT

An automatic steering of an agricultural tractor on a surface of a field to be processed is accomplished by equipping the tractor with a camera for taking a picture of a region of the field, which is in front of the tractor, including the surface that is to be processed, generating a pixel data file from a picture signal of the camera, generating texture information with respect to the texture of the surroundings of the pixels contained in the data file, classifying the pixels of the pixel data file while considering the texture information, in order to generate a binary information as to whether or not a particular pixel is to be associated with the surface that is to be processed, generating a steering signal based on the results of the classification, and repositioning the steering device of the harvesting machine according to the steering signal so that the machine is steered automatically along the surface that is to be processed.

8 Claims, 9 Drawing Sheets

PROCESS AND STEERING SYSTEM FOR THE AUTOMATIC STEERING OF AN AGRICULTURAL VEHICLE

FIELD OF THE INVENTION

The invention concerns a process for the automatic steering of an agricultural machine on a field along a surface to be processed, as well as a corresponding steering system.

BACKGROUND OF THE INVENTION

In past years many operations of agricultural vehicles have been automated, which previously were controlled manually by an operator. In order to reduce the work load on the operator, for example, various steering systems have been proposed that automatically steer the vehicle across a field. They can reduce the work load on the operator and make it possible for the operator to concentrate on other important aspects of the work, such as a control of the load on the operating arrangements of the vehicle. In the future it may also be conceivable that such vehicles could be operated across a field without an operator.

Automatic steering systems have been described which rely on various principles. Systems operating without contact can be divided into systems based an a measurement of distance that attempt to detect the difference in height between the harvested crop that has been cut and the crop that has not been cut and systems based on a picture image that attempt to detect the difference in appearance between the harvested crop that has been cut and the crop that has not been cut at the side of the edge of the harvested crop or the difference between the plants and the ground.

For example, systems based on a measurement of distance can be found in EP 0 887 660 A and EP 1 271 139 A.

EP 0 887 660 A describes a measuring arrangement in which a laser beam directed downward towards the ground is pivoted across a range of angles. On the basis of its direction and position, the location of the point is determined at which the laser beam is being reflected. In this way a profile of the height of the ground is determined that makes it possible to recognize a swath or an edge of the harvested crop at the border between the part of the field of a cereal crop that has been harvested and the part remaining standing and thereby to generate a measurement signal.

In a laser distance measuring arrangement of this type EP 1 271 139 A proposes in addition that the amount of the crop to be taken up can be determined by the intensity of the reflected laser radiation.

A disadvantage of the systems based on the measurement of distance lies in the fact that a relatively costly distance measuring arrangement is required with a laser and an electronic arrangement for the determination of the elapsed running time of the laser beam.

Examples of systems based on the use of a picture image that employ a camera directed at the field and an electronic picture processing arrangement can be found in DE 35 07 570 A, EP 0 801 885 A, WO 98/46065 A, WO 96/17279 A, JP 01 319 878 A, JP 03 012 713 A, U.S. Pat. No. 6,278,918 B, U.S. Pat. No. 6,285,930 B, U.S. Pat. No. 6,385,515 B, and U.S. Pat. No. 6,490,539 B.

DE 35 07 570 discloses an automatic steering system for an agricultural tractor that is intended to operate along or across a field with plants arranged in rows. The system derives the orientation of the rows from a picture image provided initially. Then the picture is processed along lines that extend parallel to an established orientation and the average grey scale values for each row are stored in memory. During the operation across the field, the field is processed along the same lines. The result of the processing of each line are compared with the stored values and the reference values are maintained by appropriate steering signals.

EP 0 801 885 A describes an agricultural machine with a camera whose picture image is digitized and subjected to a picture imaging process. Here each of the rows is examined for its position in a step function in which the grey scale value changes step-by-step. In the individual rows the pixel positions are determined for the greatest likelihood of the step function. These positions are utilized to generate a steering signal.

Furthermore WO 98/46065 A recognizes on the basis of the information contained in the various rows whether they contain a border of the harvested crop. On the basis of the information of all rows, the row at the end of the field to be harvested is established.

WO 96/17279 A proposes that a border be superimposed upon a picture taken by a camera (such as a parallelogram) and to identify objects within that shape by a brightness that lies above a threshold value. The objects are subjected to a regression analysis in order to determine their offset to a previously established row, which in turn is again used for the generation of a steering signal.

JP 01 319 878 A concerns a steering system in which areas of specific colors are connected to each other in a picture taken by a camera, in order to define a straight line. This line is regarded as a plant row and is used to generate a steering signal.

JP 03 012 713 A proposes an automatic steering system for a tractor in which a window of a picture that was taken by a camera is defined. In this window a virtual line is defined along which the plants are arranged. Here the picture is compared with a virtual plant row, in order to generate a steering signal.

U.S. Pat. No. 6,278,918 B proposes that the crop to be taken up be divided into two or four regions. In these regions the location and the direction of the plant row is detected. The plant row that can be recognized better is used to generate the steering signal. The decision whether or not a pixel represents a plant is performed by K-means clustering in which a histogram of the pixel values is generated, in which the x-axis represents the levels of the grey scale values and the y-axis represents the number of pixels with the particular grey scale values. The pixels that more likely represent the plants therefore appear at the right side of the histogram. The algorithm divides the histogram generated by the picture from the camera into a predetermined number of classes K, whose intervals are spaced equally. The data are processed recursively in order to find the average grey scale value of the class. Based on a predetermined matrix or so as to minimize a cost function, the borders between classes are shifted recursively until the centers of the classes are shifted by less than a given tolerance. Following that a threshold is placed to differentiate between the plants and the ground at the beginning of the class K or another class. The classification can also be performed by other clustering algorithms such as dividing processes, self-organizing maps and neuronal logic or fuzzy logic. U.S. Pat. No. 6,285,930 B, U.S. Pat. No. 6,385,515 B and U.S. Pat. No. 6,490,539 B also refer to this system.

In the systems described that are based on a picture image, the distinction is made on the basis of the brightness and/or the color of the individual pixels whether or not they represent a plant. In some of these systems the plants that have been identified are connected by a virtual line that is used to generate a steering signal. However in some cases in which automatic steering of an agricultural machine is desirable, it is not easy or almost impossible to recognize on the basis of the color or the brightness whether or not a pixel belongs to a line that should be followed. A typical example is a swath of grass that has been mowed or straw lying on a field of a cereal crop that has been harvested. The swath consists of the same material as the stubble remaining standing on the field and therefore in many cases has more or less the same brightness and color as the swath. The systems described that are based on a picture image can be applied here only with difficulty. Other systems described recognize plants on a field and orient themselves by the rows described, in order, for example, to apply chemicals. In case that no plants are present these systems cannot be applied.

In the description of EP 0 801 885 A (page 3, first paragraph) a possible process is mentioned which uses a local, two-dimensional Fourier transformation operator as basis for a texture-based segmentation in order to establish a special frequency band with a significant difference between plants that have been cut and those remaining standing. The fact is cited that this process did not show any clear indication of a significant difference in its initial tests. For that reason it was abandoned.

The problem underlying the invention is seen in the need to make available a process for automatic steering of an agricultural machine and a corresponding steering system, that operates reliably and can be attained at reasonable cost.

SUMMARY OF THE INVENTION

According to the present invention there is provided a novel steering system and process for automatically steering an agricultural machine across a field for processing crop.

An broad object of the invention is to use an optical system for generating signals used in a steering device for automatically controlling the steering of an agricultural machine across a field containing a crop being harvested.

The above object is accomplished by equipping a harvesting machine with a camera that is aimed at the area in front of the machine including the surface to be processed. The camera delivers two-dimensional pictures of the surface to be processed and adjacent areas of the field at certain time intervals. A pixel data file is generated from the picture signal of the camera, that is processed further by an electronic picture processor, in order to generate a steering signal so as to guide the machine automatically along the surface to be processed. An advantage of the use of a picture image system lies in the lower cost as compared to that of a system based on distance measurements.

The invention proposes that texture information regarding the texture of the surroundings of the individual pixels that are to be evaluated be derived from the pixel data file. Information is generated that contains information about the appearance of the structure of the picture in the vicinity of the pixel, that is, for example, whether the structure is uniform or irregular, or in what direction the existing details are oriented such as, for example, stalks of the harvested crop or clods of earth. If the camera, for example, looks at a mowed field with a swath, the field generally shows short, vertical stalks and the swath shows longer stalks with various differing orientations. Analogously during ground breaking operations the surface that is to be processed differs from the adjacent areas of the field, since, for example, after plowing or cultivating it shows larger or smaller clods of earth with an irregular surface than before. This texture information is used as basis for a classification whether or not the pixel that is to be processed is to be associated with the surface to be processed (Binary decision).

Since in the state of the art not only the brightness of the pixel but beyond that the information of the classification are provided as basis, it rests on a relatively secure basis. Thereby the position of the surface that is to be processed can be recognized without any problems. On the basis of the pixels representing the recognized position of the surface that is to be processed, or the surface that is not to be processed any more, and/or the surface that is not yet to be processed, a steering signal is generated that is transmitted to the steering devices of the machine.

The texture information can be gained from a texture analysis, in particular by an analysis that is independent of direction or is dependent upon direction. In a texture analysis, independent of direction information, the neighbors of the pixel in all directions are considered. In a texture analysis that is dependent upon direction, only the neighbors in certain directions are evaluated. The texture analysis that is dependent upon direction is particularly useful when characteristics appear preferentially in certain directions in the picture. The texture analysis that is dependent upon direction or the texture analysis that is independent of direction can be performed, for example, by means of a grey scale value dependency analysis.

Alternatively, or in addition, the texture can be examined by means of a multi-spectral analysis. Here a camera is used that can acquire at least two different wave lengths of light. In these different wave lengths the texture in the neighborhood of the pixel can also appear differently, so that the decision whether or not the individual pixels in each case represent the surface that is to be processed can be supported by an additional item of information. As a multi-spectral analysis, a color analysis can be provided, in particular a red, green, blue (RGB) analysis.

The decision whether or not the individual pixels represent the surface that is to be processed is reached by a so-called classifier. An appropriate classifier is a neuronal network. Before the beginning of the operation, the classifier is preferably subjected to a learning process by means of a picture submitted to it and information about areas of the picture that show the surface that is to be processed and areas of the picture that show the surface that is not to be processed. The learning process can be performed during the manufacture in the factory or before the beginning of the operation on a field.

The steering system, according to the invention, is particularly appropriate for the guidance of the harvesting machine along a harvested crop made available in the form of a swath, since it permits a clear distinction between the stalks in the swath and the stalks remaining standing on the field. Such harvesting machines are, for example, forage harvesters with a pick-up as a harvested crop take-up arrangement, self-propelled balers or balers towed by a tractor and tractors with self-loading forage boxes. The swath is recognized and the harvesting machine is guided along it. However the steering system described here can also be used on harvesting machines that are moved along an edge of harvested crop, such as combines, forage harvesters with corn harvesting implements or mowing machines, since the steering system is capable of distinguishing the long, standing stalks with its heads on the upper side from the stubble on the field that has been harvested. Here the harvesting machine is guided along the edge of the harvested crop with the outer edge of the harvested crop take-up arrangement.

It should be noted that the picture produced by the camera also contains information regarding the amount or the rate of take-up of the harvested crop that is to be taken up. This information can be derived from the contours of the harvested crop and/or from its color. Thereby the steering system can calculate the rate to be expected and use this information as a basis for an automatic control of the velocity of the operation.

Another possible application for the steering system according to the invention is a ground breaking operation performed, for example, by means of a plow, a cultivator, a harrow, a roller, or the like, or the sowing. As already noted above, the texture of the ground after the processing differs from the texture before the processing. The steering system recognizes the border between the part of the field that has already been processed and the part that has not been processed on the basis of the different textures and guides the agricultural machine along it at an optimum spacing, so that the outer limit of its operating tool is guided along the border between the part of the field that has been processed and the part that has not been processed.

BRIEF DESCRIPTION OF THE DRAWINGS

The drawings show two embodiments of the invention that shall be described in greater detail in the following.

DESCRIPTION OF THE PREFERRED EMBODIMENT

Figure 1:
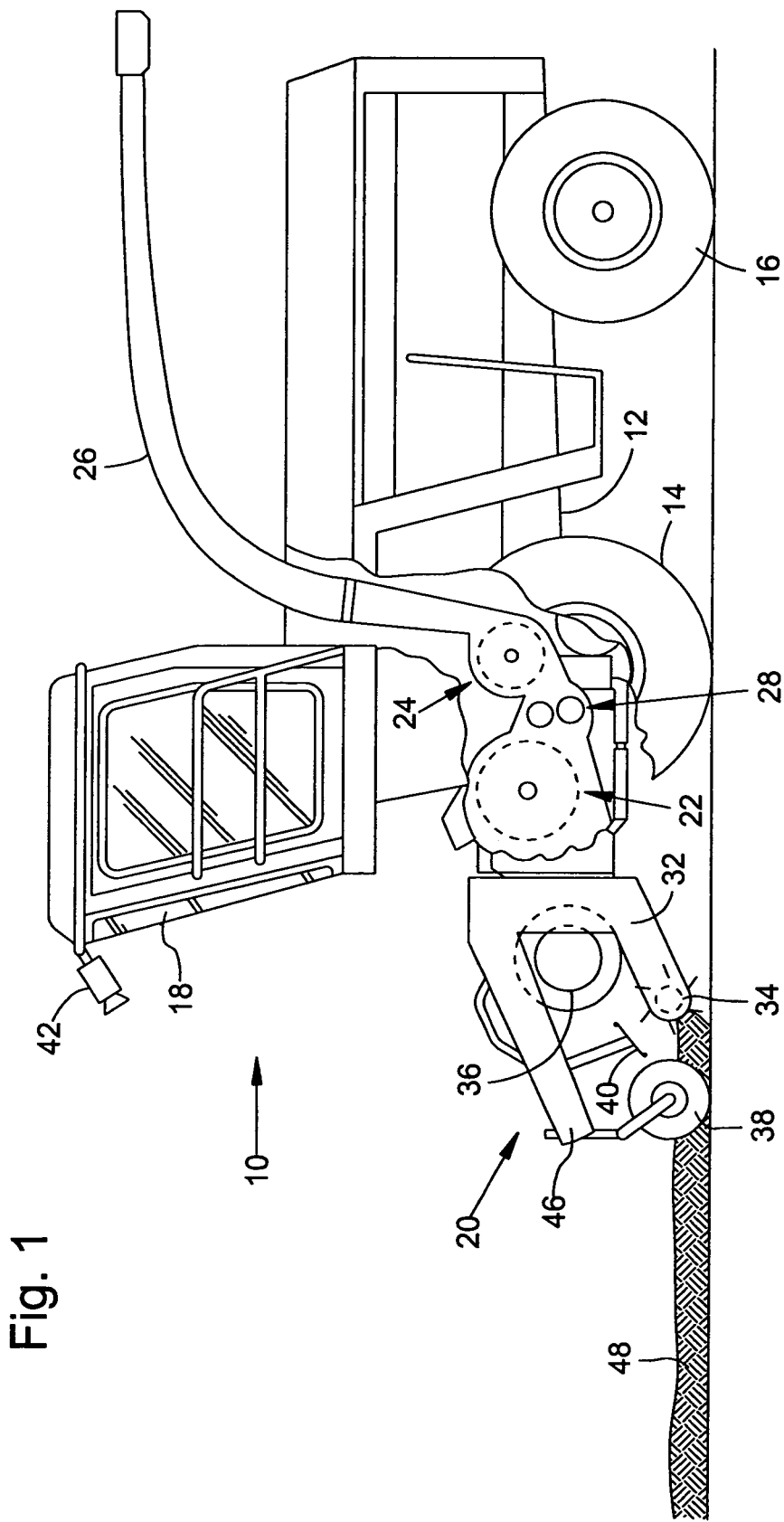
FIG. 1 shows a schematic left side view of a forage harvester with an automatic steering system constructed in accordance with the invention.

FIG. 1 shows a harvesting machine in the form of a self-propelled forage harvester 10. The forage harvester 10 is supported on a frame 12 that is carried by front driven wheels 14 and rear steerable wheels 16. The forage harvester 10 is controlled from an operator's cab 18 from which a harvested crop take-up arrangement 20 can be viewed and controlled. Crop taken up from the ground by means of the harvested crop take-up arrangement 20, for example, grass or the like, is conducted, over supply rolls, not shown, arranged within an intake housing on the front side of the forage harvester 10, to a chopper drum 22 that chops it into small pieces and delivers it to a conveyor arrangement 24. The crop leaves the forage harvester 10 to an accompanying trailer over a discharge duct 26 that can be pivoted about an approximately vertical axis and repositioned in its inclination. A post-chopper reduction arrangement 28 extends between the chopper drum 22 and the conveyor arrangement 24, through which the crop to be conveyed is conducted tangentially to the conveyor arrangement 24.

In this embodiment the harvested crop take-up arrangement 20 is configured as a so-called pick-up. The harvested crop take-up arrangement 20 is supported on the ground by a stand 32 and is carried by support wheels 38 on each side, fastened to the stand 32 over a carrier 46. The task of the harvested crop take-up arrangement 20 consists of taking up harvested crop from the ground on a field, deposited in a swath 48, and to conduct it to the forage harvester 10 for further processing. For this purpose, the harvested crop take-up arrangement 20 is moved across the field during the harvesting operation at a small spacing to the ground, while it is raised for transport on public roads or on paths. The harvested crop take-up arrangement 20 includes a conveyor arrangement 36 in the form of a screw conveyor that conveys the crop taken up from the sides of the harvested crop take-up arrangement 20 to an outlet opening, not shown, that is followed to the rear by the supply rolls. The harvested crop take-up arrangement 20 is provided with a take-up device 34, driven in rotation, arranged underneath the conveyor arrangement 36, which raises the crop from the ground by means of its conveying tines and delivers it to the conveyor arrangement 36. Moreover a hold down 40 is fastened to the carrier 46 and is in the form of a sheet metal component arranged above the take-up device 34.

The forage harvester 10 is equipped with a camera 42 on the upper side of the operator's cab 18 extending in the direction of operation. The lens of the camera 42 is aimed to the front and inclined downward at the swath 48. The camera 42 is located on the longitudinal center line of the forage harvester 10. Together with an electronic control arrangement, the camera 42 forms an automatic steering system, that shall be described in greater detail below, that guides the forage harvester 10 automatically along the swath 48, in order to simplify the work of the operator in the operator's cab 18.

Figure 2:
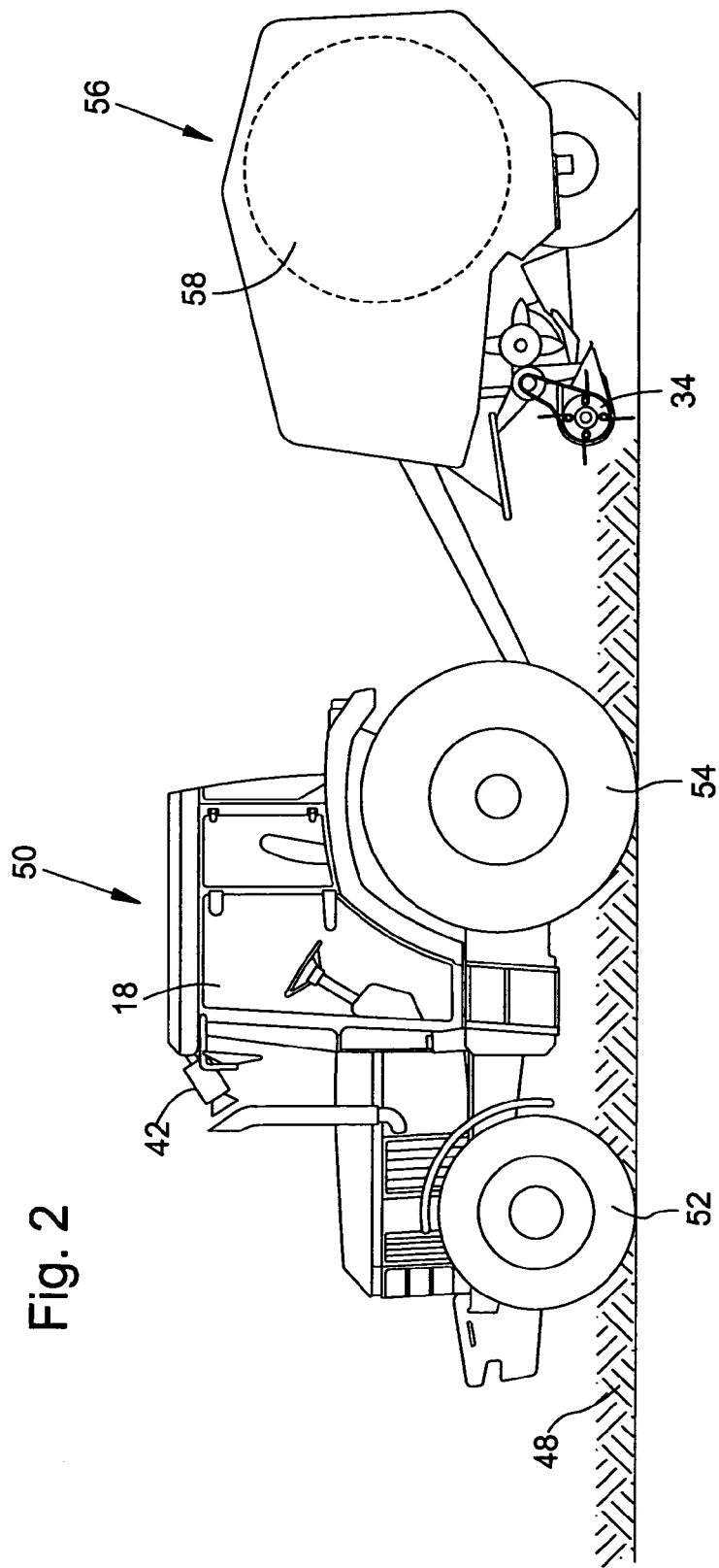
FIG. 2 shows a schematic left side view of a tractor, with an automatic steering system constructed in accordance with the invention, and a baler towed by the tractor.

At first, however, another possible application of the automatic steering system shall be described on the basis of FIG. 2. Here the camera 42 is attached at the upper side of the operator's cab 18 on the side of a tractor 50 in the forward operating direction. The camera 42 is located on the longitudinal center plane of the tractor 50 and its lens is also aimed forward and downward at the swath 48. The tractor 50 is provided with front, steerable wheels and rear, driven wheels 54. It tows a baler 56 which takes up harvested crop out of the swath 48 from the field by means of the take-up device 34 and forms it into bales 58. In place of the rotobaler shown, the baler 56 can also be a rectangular baler. It could also be configured as a self-propelled machine. The invention can also be applied to a tractor 50 used for ground-breaking operations.

At their front sides, the forage harvester 10 and the tractor 50 are equipped with lighting arrangements that make it possible to illuminate the swath 48 in case that the ambient light is not sufficient.

Figure 3:
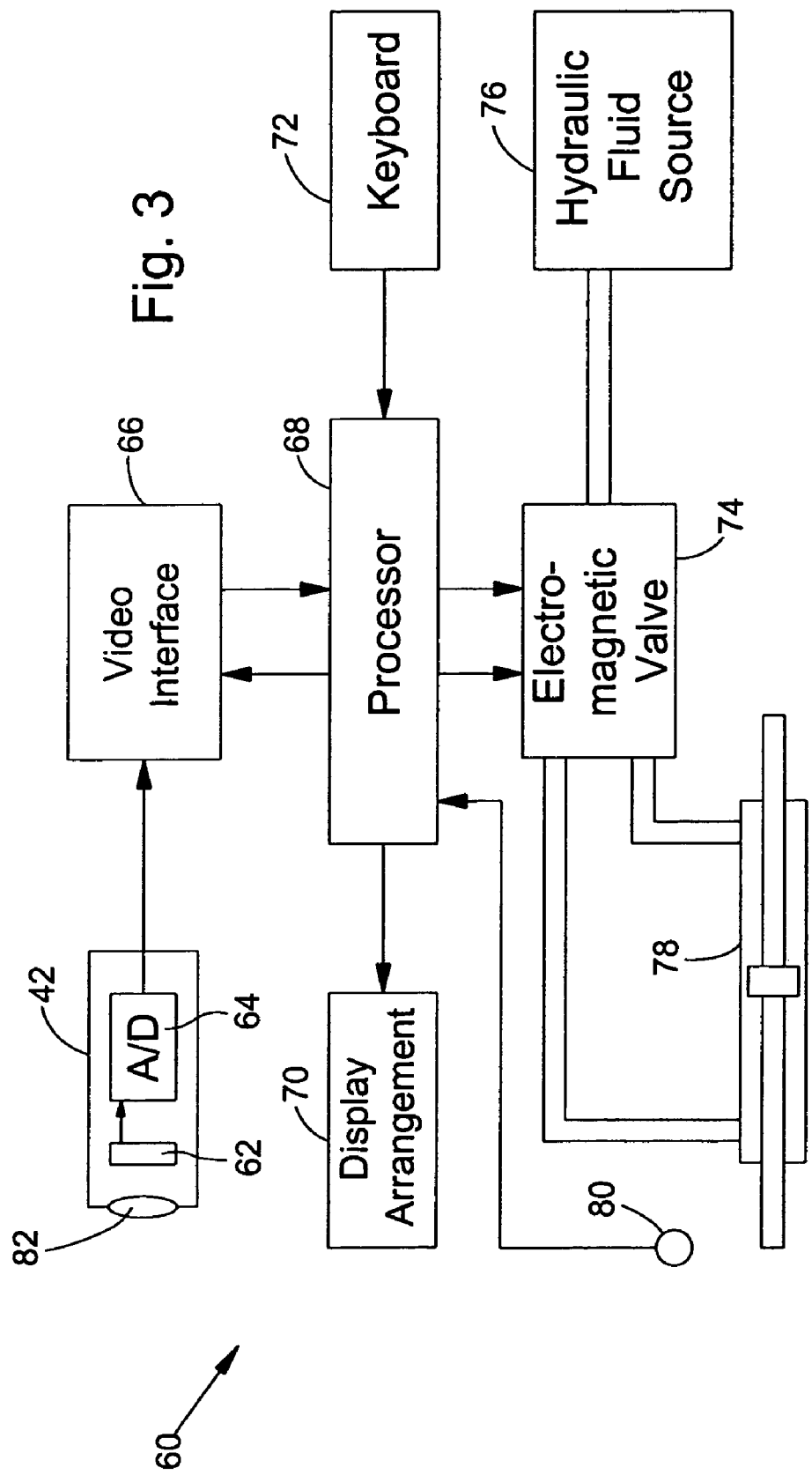
FIG. 3 is a block diagram of the steering system.

FIG. 3 schematically shows the steering system 60 of the forage harvester 10 of FIG. 1 or the steering system of the tractor 50 of FIG. 2. The camera 42 is provided with a picture sensor 62 in particular in the form of a CCD or a CMOS whose output signal is digitized by means of an analog/digital converter 64 and transmitted to a video interface 66. The picture data of the camera 42 may consist only of luminance data (grey scale values, brightness) or they may also contain chrominance or color data. A processor 68, as a rule, a microprocessor or microcontroller, communicates bidirectionally with the video interface 66. The picture generated by the lens 82 of the camera 42 on the picture sensor 62 can be displayed to the operator in the operator's cab 18 on a display arrangement 70 connected to the processor 68. The display arrangement 70 can also reproduce other information, for example, operating data of the steering system 60 and/or of the forage harvester 10 or the tractor 50. A keyboard 72 is also available to the operator as are other input devices, for example, mouse, joystick or voice input, with which the operator can provide input to the processor 68. The processor 68 controls electromagnetic valves 74 that are supplied on their input sides with pressurized hydraulic fluid from a source 76 and connected on their output sides with a steering cylinder 78. On the forage harvester 10 of FIG. 1, the steering cylinder 78 repositions the rear wheels 16, while on the tractor 50, of FIG. 2, it repositions the front wheels 52. A wheel angle sensor 80 detects the actual steering angle of the wheels 16 or 52 and transmits this information to the processor 68. The hardware configuration of such automatic steering systems 60 is sufficiently well known in the state of the art, so that here a detailed description can be omitted and reference can be made to the state of the art described initially above whose disclosure is incorporated into the present document by reference.

The task of the automatic steering system 60 consists of guiding the forage harvester 10 or the tractor 50 with the baler 56 along the swath 48 across the field without any steering effort on the part of the operator. For this purpose, the processor 68 processes the pictures of the camera 42 by means of electronic picture processing and generates, on the basis of the results, appropriate control signals for the electromagnetic valves 74.

Figure 4:
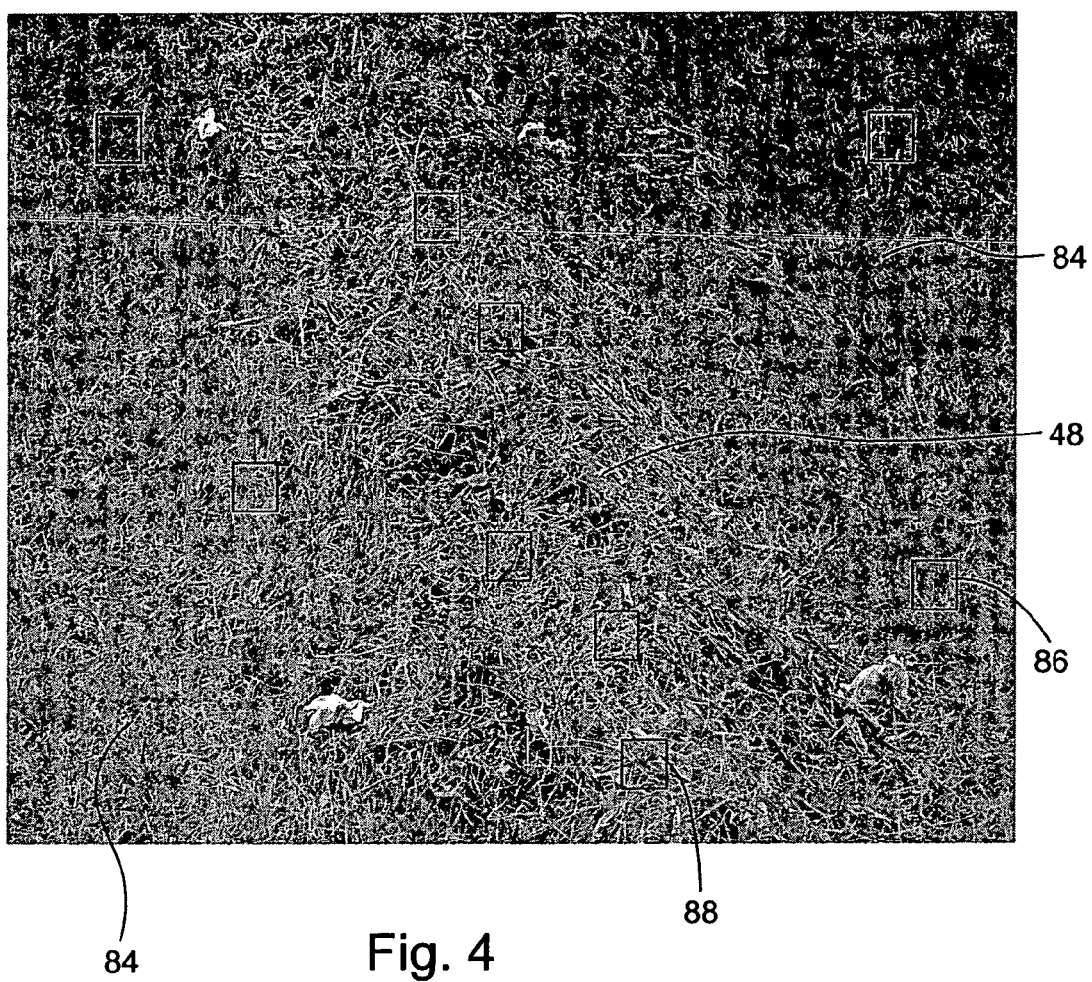
FIG. 4 is an example of a picture taken by a camera.

As a rule, the swath 48 consists of a dried crop of stalks that has been cut by means of a mowing machine, left to dry on the field and gathered by a swather, or that was deposited in the form of a swath during the harvest of a field of cereal crop by the combine. FIG. 4 shows a typical picture taken by the camera 42 during the harvest of grass. It can be seen that the brightness values of the swath 48 and the area of the field 84 alongside the swath 48 are not distinguished significantly. Therefore it would be problematic or nearly impossible to generate a steering signal by taking the individual picture points, called "pixels" in the following, of the picture signal of the camera 42 exclusively on the basis of their brightness and associating them with the swath 48 or the field 84. A picture containing chrominance data may be more appropriate to distinguish between the swath 48 and the field 84 on the basis of the colors if the stalks of the cereal crop differ sufficiently in their colors from the field. But this is not the case particularly if the stalks that remain standing on the field are at least partially dried or if the swath is to be taken up immediately after the mowing, as in the case of the harvest of cereal crop.

However, as can be seen in FIG. 4, on the field 84 only vertical stalks (grass stubble) remain standing, while in contrast thereto the swath 48 includes longer stalks lying in different directions, and to a certain proportion extending horizontally. For this reason the present invention proposes that the texture of the pixels be evaluated in order to utilize it for the decision whether a pixel is located on the field 84 or in the swath 48. The texture is understood to be the local distribution and the variation of the grey scale values (and/or the chrominance values) in a partial region of the picture. On the field, the texture consists of short, mostly vertical structures (stalks), while it consists of longer stalks in the swath, that extend in various directions.

Figure 5:
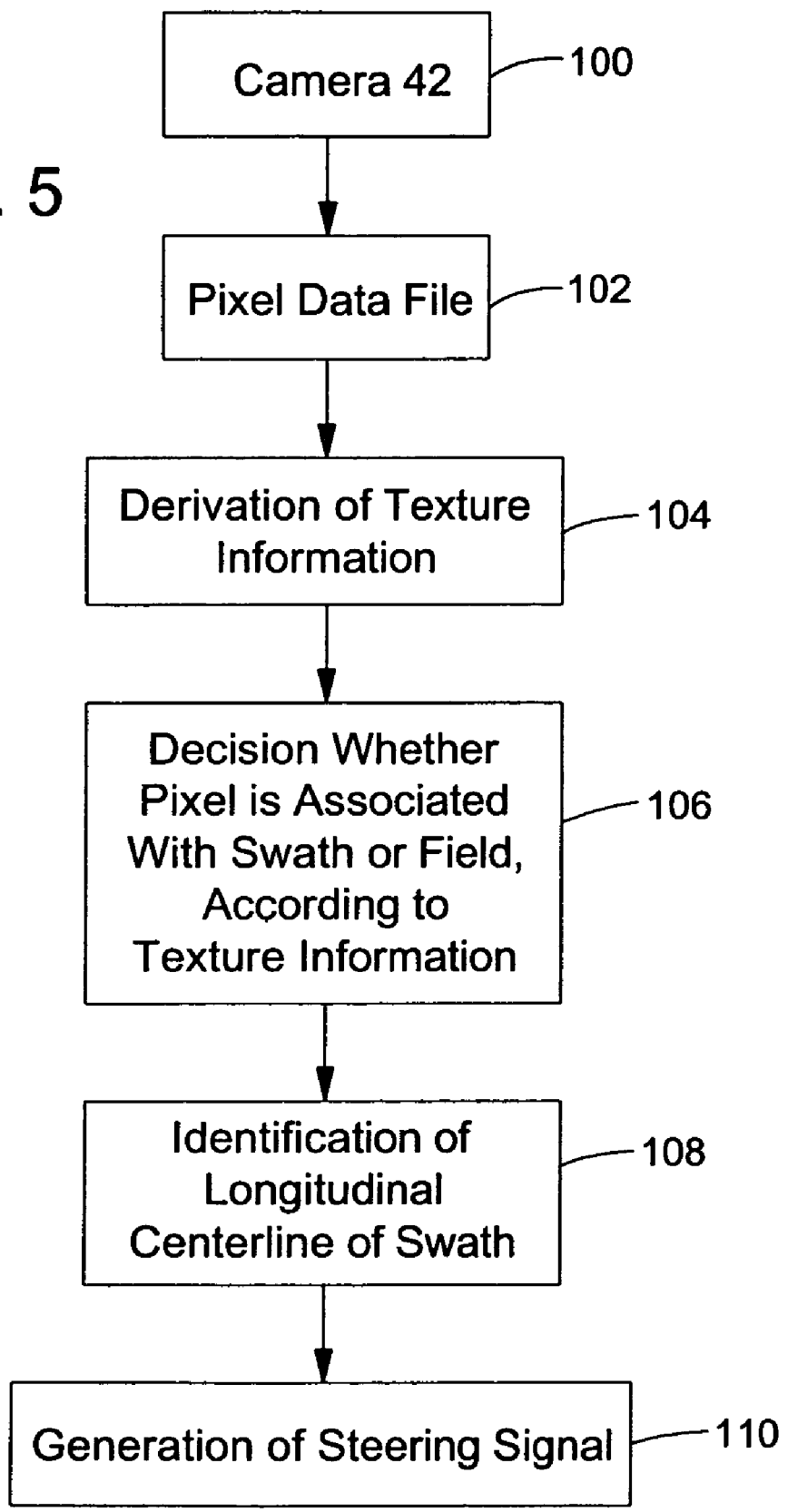
FIG. 5 is a flow chart according to which the processor of the steering system operates.

Accordingly, the processor 68 operates according to a procedure that is shown in FIG. 5. Starting in step 100 with a picture taken by the camera 42, a picture data file is made available in step 102 to the processor 68 over the video interface 66. In step 104, a texture information is derived for each of the pixels that are to be processed further from this picture data file. In order to reduce the calculating time, in step 104 all incoming pixels can be processed or only a part of them that include a region containing the swath 48.

The texture information in step 104 can be derived in various ways. There is the possibility of performing a grey scale value dependency analysis, in which a dependency matrix is calculated. For small areas of the picture, the dependency matrix contains information as to which combinations of adjoining grey scale values appear in the neighborhood of the pixel. If the grey scale values in the neighborhood of the pixel are homogeneous, the dependency matrix thereby points to the fact that only identical grey scale values are present. On the other hand, if the grey scale values in the neighborhood vary very sharply, the result is a different dependency matrix. In a preferred embodiment, the grey scale value analysis considers only the direct 8 immediate neighbors of the pixel, at the edge of the picture area evaluated this number is reduced to 3 (in the corners) or 5. In this way, the result is information whether the texture in the neighborhood of the pixel is uniform or not.

To deduce the texture information in step 104, a grey scale value dependency analysis dependent upon direction can also be performed. As can be seen on the basis of FIG. 4, and was already mentioned above, the field 84 contains many vertical line structures. On the other hand, in the swath 48 the stalks are wildly disheveled. Therefore, an obvious solution is to disregard the diagonal neighbors of the pixels and to utilize only the pixels below and above as well as to the left and the right of the pixel considered here for the establishment of a dependency matrix. Thereby, the texture information deduced in this way in step 104 contains information whether the texture in the neighborhood of the pixel contains vertical or horizontal structures. The amount of information, but not necessarily the information contents, is reduced compared to the grey scale value dependency analysis not dependent of direction.

Furthermore, the texture information in step 104 can also be generated by a color analysis. In this investigation, the chrominance information of the swath 48 is analyzed. If a color camera 42 is used, then each pixel of the color picture that was generated contains three color information, in each case for red, green and blue. Hence, if the swath 48 is colored differently from the field 84, the color information can be used to distinguish between the two, even at the same brightness.

Finally there is also the possibility of combining the grey scale value dependency analysis or the grey scale value dependency analysis that is dependent upon direction with the color analysis. Hence, for each pixel that is to be evaluated, a dependency matrix that is independent of direction or such a matrix that is dependent upon direction is generated for the grey scale values and for the color information, that are processed further together. In the aforementioned analyses, the so-called second order statistic can be applied. Moreover, a series combination is possible in which initially a number of RGB analyses are performed and subsequently the results of the RGB analyses are subjected to a texture analysis.

After information about the texture in the vicinity of the pixel has been gained in step 104, step 106 follows according to FIG. 5. There, a classification is performed on the basis of the texture information made available in step 104, that is, for each pixel that is to be processed, or group of pixels that are to be processed, a decision is reached whether it, or they, belong to the swath or to the field. Here, any desired appropriate algorithms can be used. The use of a neuronal network has been shown to be particularly advantageous, since it can conform to changes in the picture taking conditions due to its learning capability. The application of fuzzy logic or neuro-fuzzy logic would also be conceivable. This decision is performed in two steps: At first, a likelihood value is evaluated for each pixel or group of pixels that reproduces the likelihood that it belongs or they belong to the swath. Following this, the particular likelihood is tested to see whether or not it exceeds a threshold value (as a rule 50%).

Figure 6:
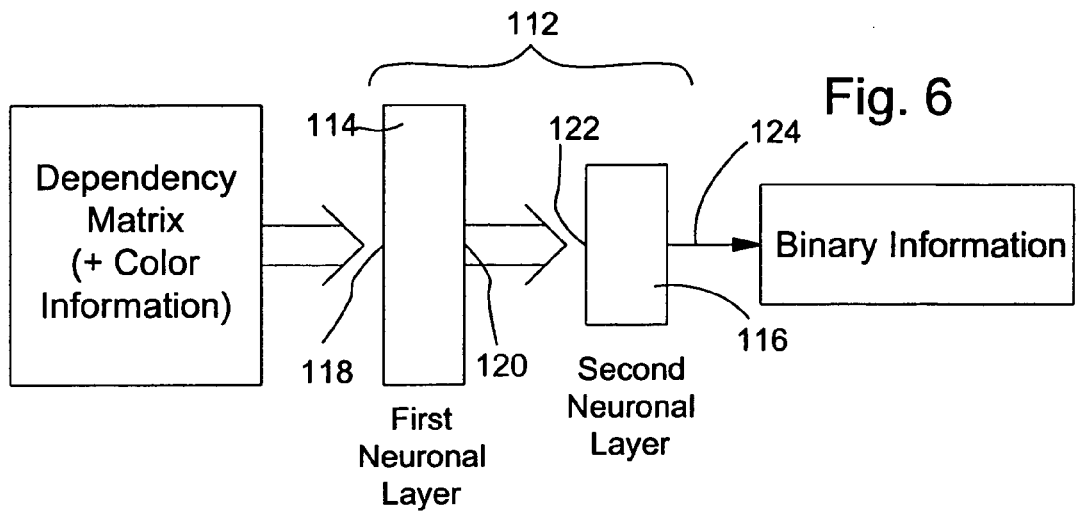
FIG. 6 is a schematic of a neuronal network that can be used for the decision as to whether a pixel belongs to the field or to a swath.

A possible configuration of such a neuronal network 112 is shown schematically in FIG. 6. The neuronal network 112 is composed of at least two neuronal layers 114, 116. The first neuronal layer 114 is provided with an inlet 118 to which the texture information gained in step 104 in the form of the likelihood matrix and, if necessary, the color information is supplied. In the neuronal layer 114, a linkage of the input values with the information that can be learned is performed, the result of which is available at an outlet 120 of the first neuronal layer 114 and is conducted to the inlet 122 of the neuronal layer 116. As shown in the illustration, the first neuronal layer 114 makes available several parallel output signals to the second neuronal layer 116. The second neuronal layer 116 has a single outlet 124. In the second neuronal layer 116 a linkage is also performed of the signal present at the inlet 122 with information that can be learned. Finally, at the outlet of the second neuronal layer 116, information is made available that can be converted to binary form whether the pixel that was examined or the pixel group belong to the swath 48 or to the field 84. The network 112 could also include further neuronal layers between the two neuronal layers 114, 116 shown. Any desired other network architecture can be used in place of the so-called back propagation network shown.

For every pixel that is to be examined, its own neuronal network 112 could be made available, or a single network 112 can be used that is supplied with all the input data for all the pixels one after the other. As a rule, the neuronal network 112 is put into practice by means of software in the processor 68. In other embodiments it could also be realized by special hardware.

Figure 7:
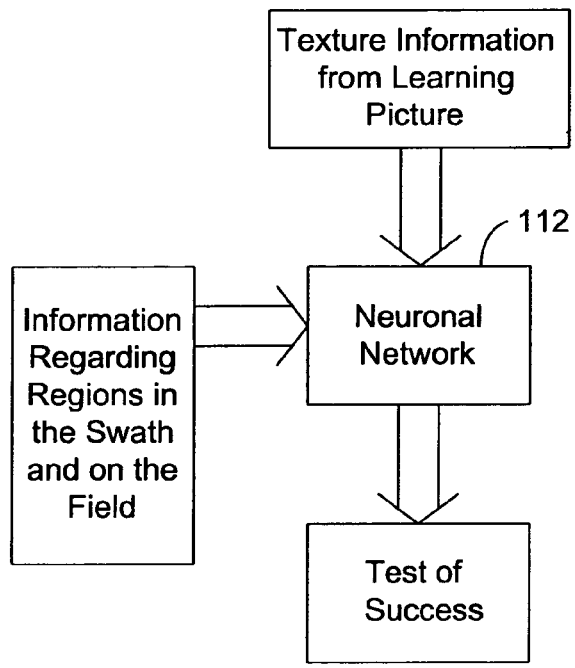
FIG. 7 shows the operation of the neuronal network of FIG. 6 in a learning phase.

As previously mentioned, the neuronal network 112 is capable of learning. Therefore, it is initially taught which parts of the picture that was taken belong to the swath 48 and which parts belong to the field 84. This process is shown schematically in FIG. 7. The neuronal network 112 is supplied with texture information generated in a learning phase (in place of texture information derived from a picture taken by a camera), that can, for example, be stored electronically, or alternately the forage harvester 10 or the tractor 50 is positioned on the field 84 in front of a swath 48 and a picture is taken of the swath 48 by the camera 42. Furthermore the neuronal network 112 is supplied with information about the position of regions of the swath 48 and of the field 84 in each of the pictures. These may be rectangles 86 or 88, as is shown in FIG. 4. Thereby, masks are defined whose interior contains pixel masses belonging to the swath 48 or the field 84. On the basis of this information, the neuronal network 112 is in a position to learn how the swath 48 and the field 84 appear and to distinguish between them. This learning process could also be performed by the operator manually steering the forage harvester 10 or the tractor 50 along a swath 48. Thereby the neuronal network 112 also learns to distinguish between the swath 48 and the field 84. The neuronal network 112 delivers a resulting picture that is used to confirm the success. The picture can be reproduced on the display arrangement 70 and inform the operator whether the operating conditions for the automatic steering system 60 are adequate or whether it would be better to revert to manual steering, for example, in the case of darkness or fog. The learning phase of the neuronal network 112 can be repeated again and again or extended upon a corresponding input from the operator, or performed only once previously during the manufacture of the steering system or, differing from the above description or for changed operating conditions selected values stored in memory or replacement memory cards may be provided.

Figure 8:
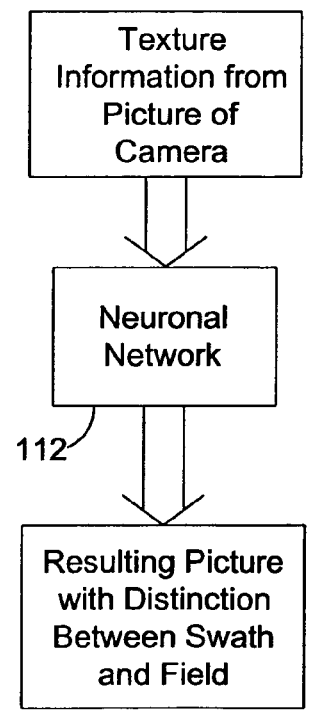
FIG. 8 shows the operation of the neuronal network of FIG. 6 in an analysis phase.

After the conclusion of the learning phase (FIG. 7) the neuronal network 112 operates according to FIG. 8. It is supplied with texture information derived from pictures from the camera 42 and it delivers a pixel picture in which a binary distinction is made between swath and field. By supplying the neuronal network 112 with the texture information, the distinction between the swath 48 and the field 84 is simplified and made possible even under difficult viewing conditions.

Reference will now again be made to FIG. 5 in which a binary pixel data file is now available following step 106. The individual pixels are associated with either the field 84 or the swath 48. On the basis of this pixel data file, in the following step 108, the longitudinal axis of the swath 48 is detected, that is, its direction and distance from the longitudinal center line of the forage harvester 10 or the tractor 50 is determined (that is, the angle to the longitudinal center line of the forage harvester 10 or the tractor 50). On the basis of the direction and the distance in step 110, a steering signal is then generated which is transmitted to the electromagnetic valves 74. Thereby the forage harvester 10 or the tractor 50 operates automatically along the swath 48. The procedure shown in FIG. 5 is repeated regularly, for example, 25 times in a second. Higher or lower frequencies of repetition could also be used. At the end of the swath, the operator manually steers the harvesting machine to the next swath that is to be taken up. In another embodiment, the next swath is also recognized by the automatic steering system 60 and the harvesting machine is automatically steered there.

For the sake of edification, FIGS. 9 through 15 show pictures that result from the picture shown in FIG. 4 during the processing shown in FIG. 5.

Figure 9:
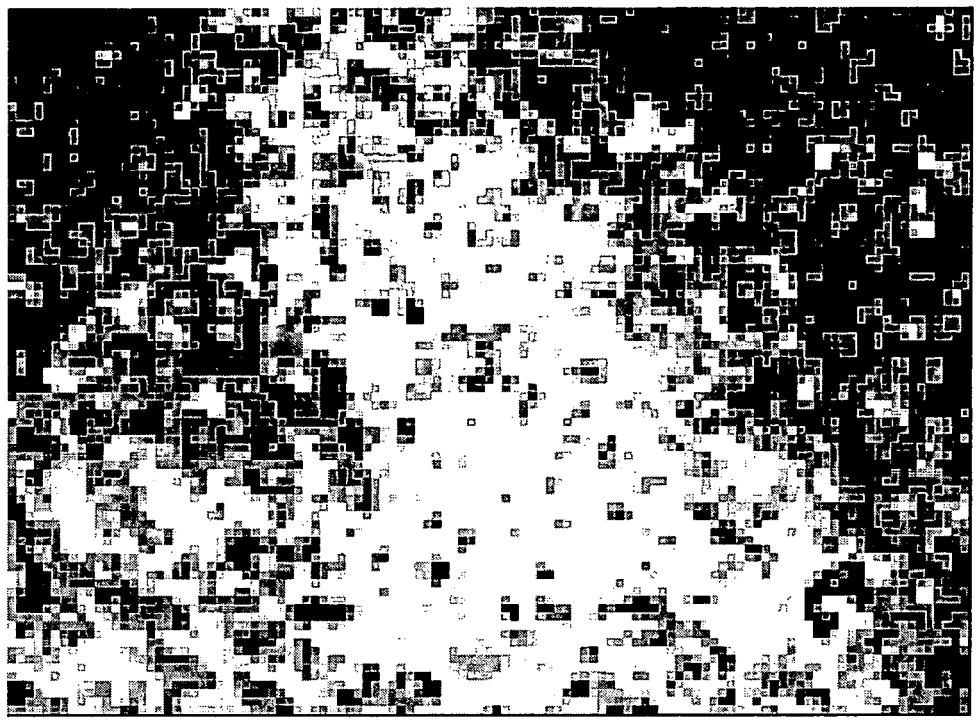
FIG. 9 shows the result of a grey scale value analysis independent of direction based on the picture of FIG. 4.
Figure 10:
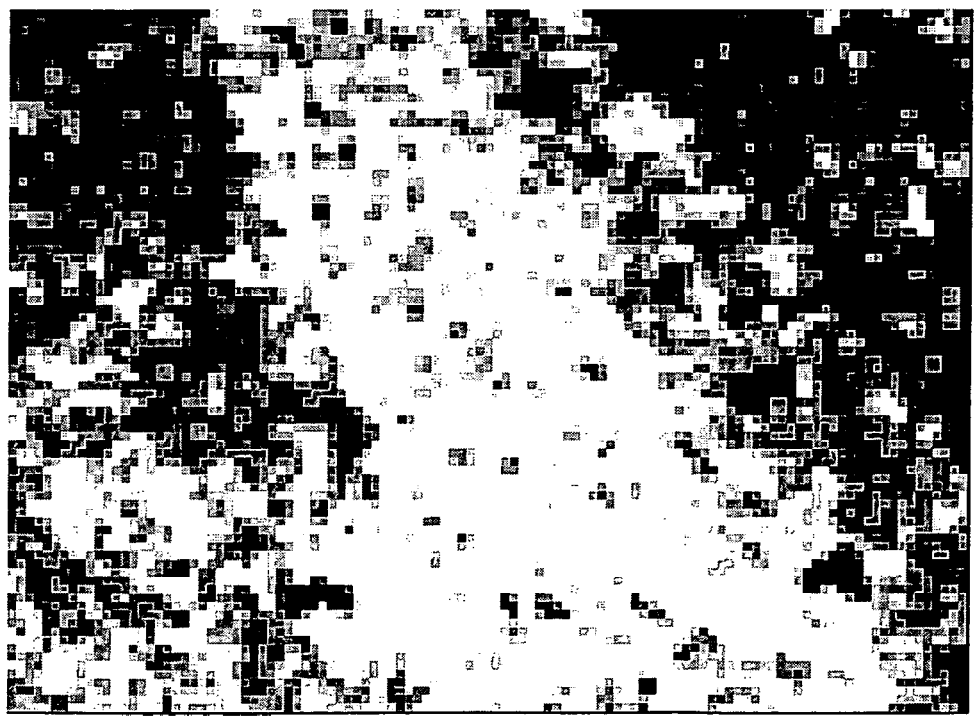
FIG. 10 shows the result of a grey scale value analysis dependent upon direction based on the picture of FIG. 4.

FIG. 9 shows the result of a grey scale value dependency analysis independent of direction. FIG. 10 shows a grey scale value dependency analysis that is dependent upon direction. In both figures, the likelihood values calculated by the neuronal network are shown for the case that the pixel belongs to the swath, before it was binarized. A comparison of FIGS. 9 and 10, that both quasi represent the result of step 106 of FIG. 5 before the classification, shows the positive effect of the grey scale value dependency analysis dependent upon direction.

Figure 11:
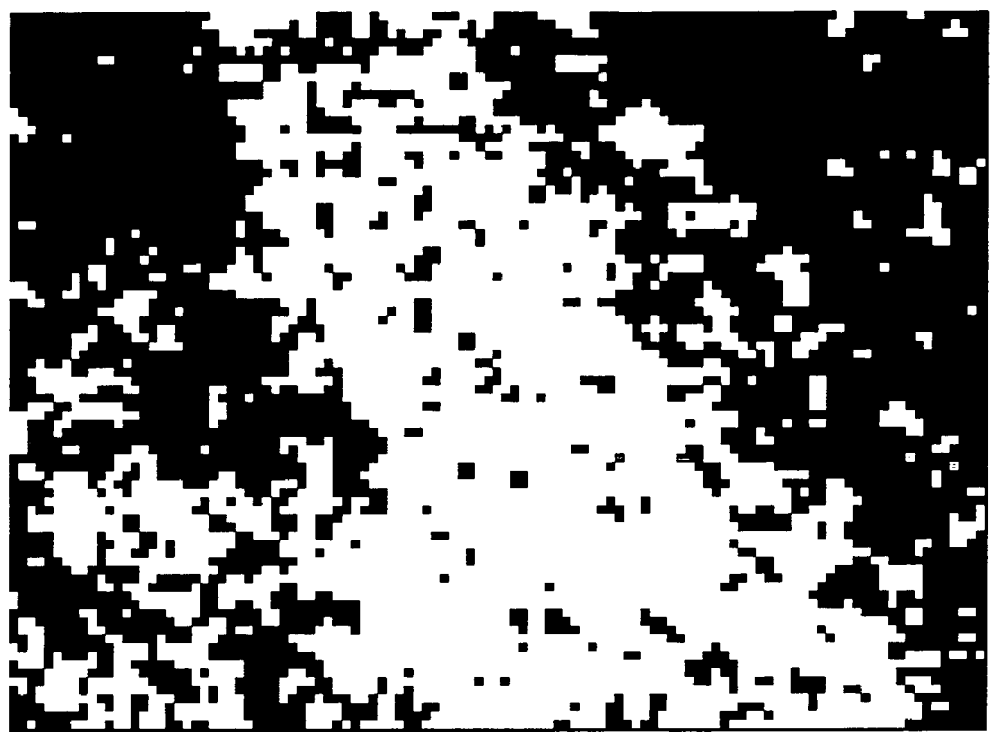
FIG. 11 shows a picture resulting from the decision whether a pixel belongs to the swath or to the field, that is based on the picture of FIG. 9.

Therefore, for the further processing, only the results of the grey scale value dependency analysis dependent upon direction are used. FIG. 11 shows the result of the decision (step 106 in FIG. 5) whether the pixels belong to the swath 48 (white) or to the field 84 (black), that is, the binarization by the neuronal network 112. Previously, the neuronal network 112 was subjected to a learning phase (FIG. 7) in which the picture of FIG. 4 was presented to it as learning picture and the rectangles 86, 88 as representing surfaces belonging to the field 84 or the swath 48. This network has also shown good results with other pictures.

Figure 12:
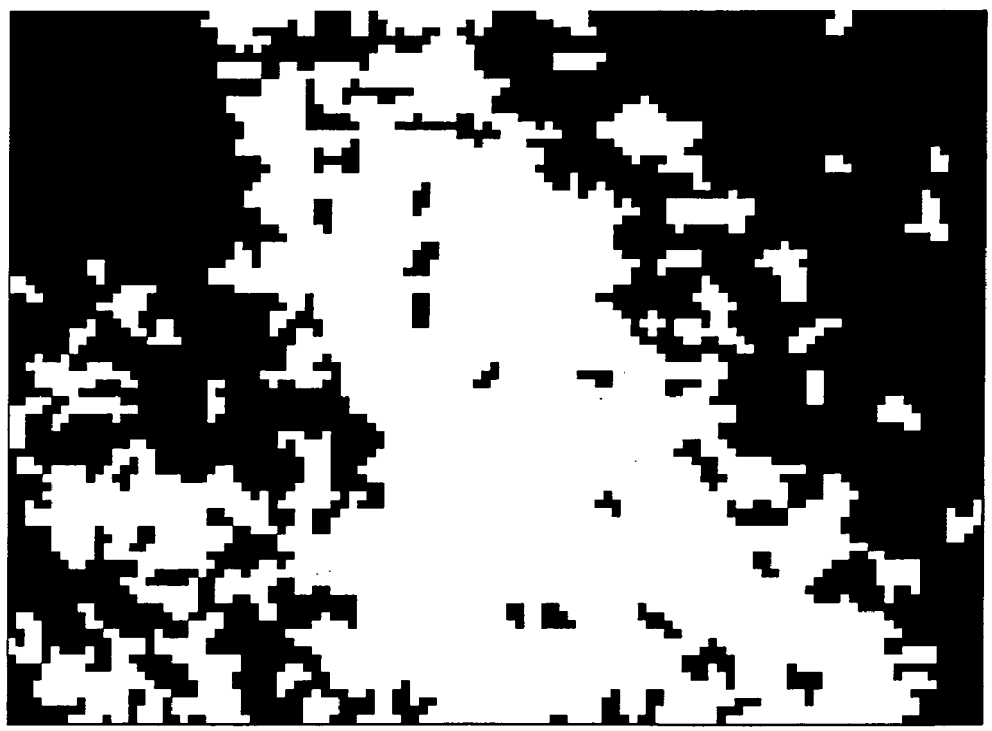
FIG. 12 shows the picture of FIG. 11 after the removal of all surfaces that are smaller than 450 pixels.
Figure 13:
FIG. 13 shows the remaining largest surface of the picture of FIG. 12.
Figure 14:
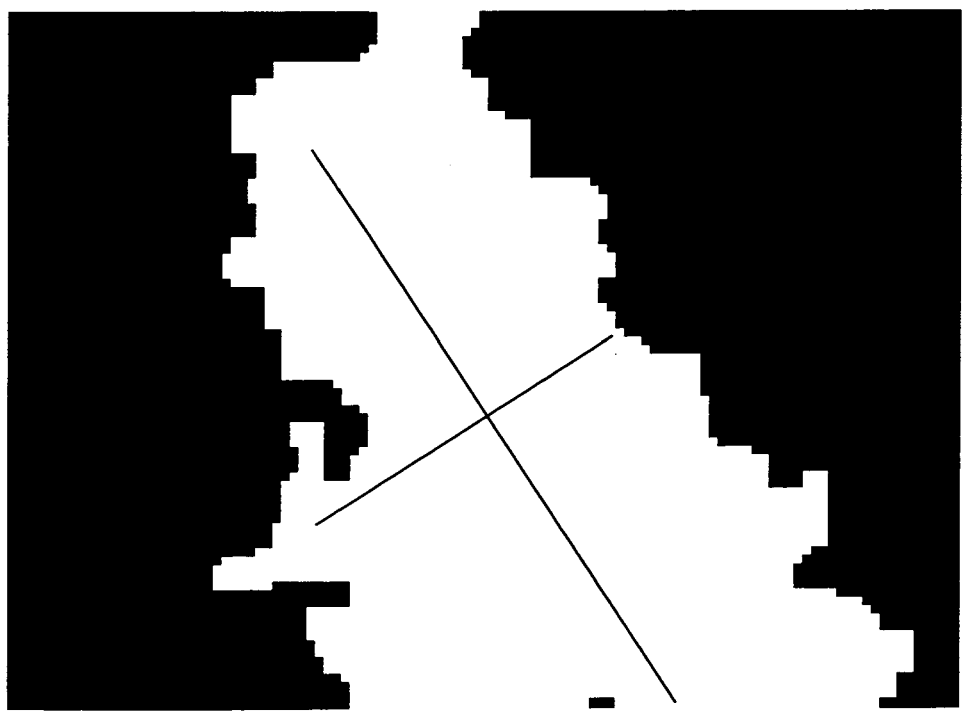
FIG. 14 shows the final result of the processing of the picture of FIG. 13 with the axes of inertia illustrated in the picture.

FIGS. 12 through 14 correspond to process steps of the step 108 of FIG. 5. In FIG. 12, all continuous surfaces were calculated and all surfaces were removed that were less than a threshold value (here the threshold was 450 pixels). In FIG. 13, the largest remaining surface of FIG. 12 is shown, with which subsequently in FIG. 14 the small black intervening areas were removed by the application of deletion and erosion. Moreover, FIG. 14 shows two axes of inertia of the remaining surfaces of the swath 48. On the basis of the axes of inertia that extend in the longitudinal direction, the direction of the swath 48 and its distance from the longitudinal center plane of the forage harvester 10 or the tractor 50 can be determined. These magnitudes are utilized for the generation of a steering signal for the electromagnetic valves 74, where the actual value given by the wheel angle sensor 80 is considered.

Having described the preferred embodiment, it will become apparent that various modifications can be made without departing from the scope of the invention as defined in the accompanying claims.

The invention claimed is:

1. A process for automatically steering an agricultural machine, equipped with a steering device, on a surface of a field on which a cut swath of crop is lying that is to be processed, comprising the following steps:
   a) taking a picture, with a picture taking camera, of an entire width of a region of the field surface lying in front of the machine and including at least one cut swath of crop;
   b) generating a pixel data file from a picture signal from the camera;
   c) generating texture information with respect to the texture of the surroundings of the pixels of the pixel data file;
   d) classifying pixels of the pixel data file under consideration of the texture information, in order to generate a binary information, whether or not the particular pixels are to be assigned to the cut swath of crop that is to be processed;
   e) generating a steering signal based on the results of the classifications, and;
   f) repositioning the steering device of the agricultural machine according to the steering signal, so that the machine is steered automatically along the cut swath of crop to be processed.

2. The process, as defined in claim 1, wherein said texture information that is generated in step (c) is generated by a texture analysis that is dependent upon direction, particularly a grey scale value dependency analysis and/or a multi-spectral analysis.

3. The process, as defined in claim 1, wherein said classifying carried out in step (d) is done using a neuronal network.

4. The process, as defined in claim 1, wherein, prior to step (d) a learning step is performed wherein information relating to a picture taken of a field to be processed is provided showing a certain region containing a swath of crop that is to be processed and certain other regions that are not to be processed.

5. An automatic steering system for automatically steering an agricultural harvesting machine, equipped with a steering device, on a field along a surface containing a swath of cut crop that is to be processed, comprising: a picture taking camera mounted on said harvesting machine for taking a picture of an entire width of a region of the field surface, containing the cut swath of crop, located in front of the harvesting machine, and for generating a picture signal; a processing arrangement connected to said camera for receiving said picture signal from said camera and for generating a pixel data file from said picture signal; said processing arrangement further including structure operating so as to generate texture information relative to the texture of the surroundings of the pixels of the pixel data file, to perform a classification of the pixels of the pixel data file considering the texture information, in order to generate binary information as to whether or not the particular pixel is to be associated with the swath of cut crop to be processed and, based on the results of the classification, to generate a steering signal that is connected to said steering device so as to be transmitted to said steering device so that the machine can be automatically steered along the swath of cut crop to be processed.

6. The steering system, as defined in claim 5, wherein said texture information that is generated is done dependent upon direction, particularly a grey scale value dependency analysis and/or a spectral analysis.

7. The steering system, as defined in claim 5, wherein said classification of whether or not the individual pixels are to be associated with the pixel data file of the cut swath of crop, that in each case is to be taken up is obtained by means of a neuronal network.

8. The steering system, as defined in claim 5, wherein said processing arrangement performing the classification is subjected to a learning process before the beginning of the operation by means of a picture supplied to it and information about regions of the picture that show a surface on which is found a swath of cut crop that is to be processed and regions of the picture that show a surface that is not to be processed.

* * * * *